United States Patent [19]

Nakata et al.

[11] Patent Number: 5,528,407
[45] Date of Patent: Jun. 18, 1996

[54] TRANSCEIVER MODULE FOR OPTICAL COMMUNICATION

[75] Inventors: Naotaro Nakata; Haruo Tanaka; Naofumi Aoki, all of Kyoto; Kenji Okada, Tokyo, all of Japan

[73] Assignees: Rohm Co., Ltd.; Nippon Telegraph & Telephone Corporation, both of Kyoto, Japan

[21] Appl. No.: 363,278

[22] Filed: Dec. 22, 1994

[30] Foreign Application Priority Data

Dec. 27, 1993 [JP] Japan .................................. 5-331791
Dec. 28, 1993 [JP] Japan .................................. 5-338073

[51] Int. Cl.$^6$ .................................................. H04B 10/00
[52] U.S. Cl. ........................... 359/152; 359/159; 359/173
[58] Field of Search ................................... 359/113, 152, 359/159, 173, 168–170; 455/90

[56] References Cited

U.S. PATENT DOCUMENTS

| | | | |
|---|---|---|---|
| 4,625,333 | 11/1986 | Takezawa et al. | 359/152 |
| 4,989,934 | 2/1991 | Zavracky et al. | 359/152 |
| 5,122,893 | 6/1992 | Tolbert | 359/152 |

*Primary Examiner*—Leo Boudreau
*Assistant Examiner*—Kinfe-Michael Negash

*Attorney, Agent, or Firm*—Brumbaugh, Graves, Donohue & Raymond

[57] ABSTRACT

A transceiver module for optical communication includes a light-emitting element, a light-receiving element and a rod lens. Light from the light-emitting element is condensed onto the top end of the rod lens. A ferrule of an optical fiber is brought into physical contact with the top end surface of the rod lens so as to couple the light-emitting element and the light-receiving element with the optical fiber. The rod lens is held by a support supported by a spring member on a housing, and the outer diameter of the rod lens is formed so as to be substantially equal to the outer diameter of the ferrule. An opening portion is provided in the housing so that the top end of the ferrule of the optical fiber is slidably fitted into one end of a sleeve, the other end of which is slidably fitted onto the outer circumference of the rod lens. Also, a transceiver module includes a light-emitting element for emitting transmission signal light, a coupling lens for connecting the transmission signal light emitted from the light-emitting element to a light transmission path, and a light-receiving element for receiving detection signal light from the light transmission path, in which the transmission signal light emitted from the light-emitting element is reflected on a surface of the light-receiving element and connected to the light transmission path through the coupling lens; and the detection signal light from the light transmission path is received by the light-receiving element.

21 Claims, 11 Drawing Sheets

FIG. 1
FIG. 2
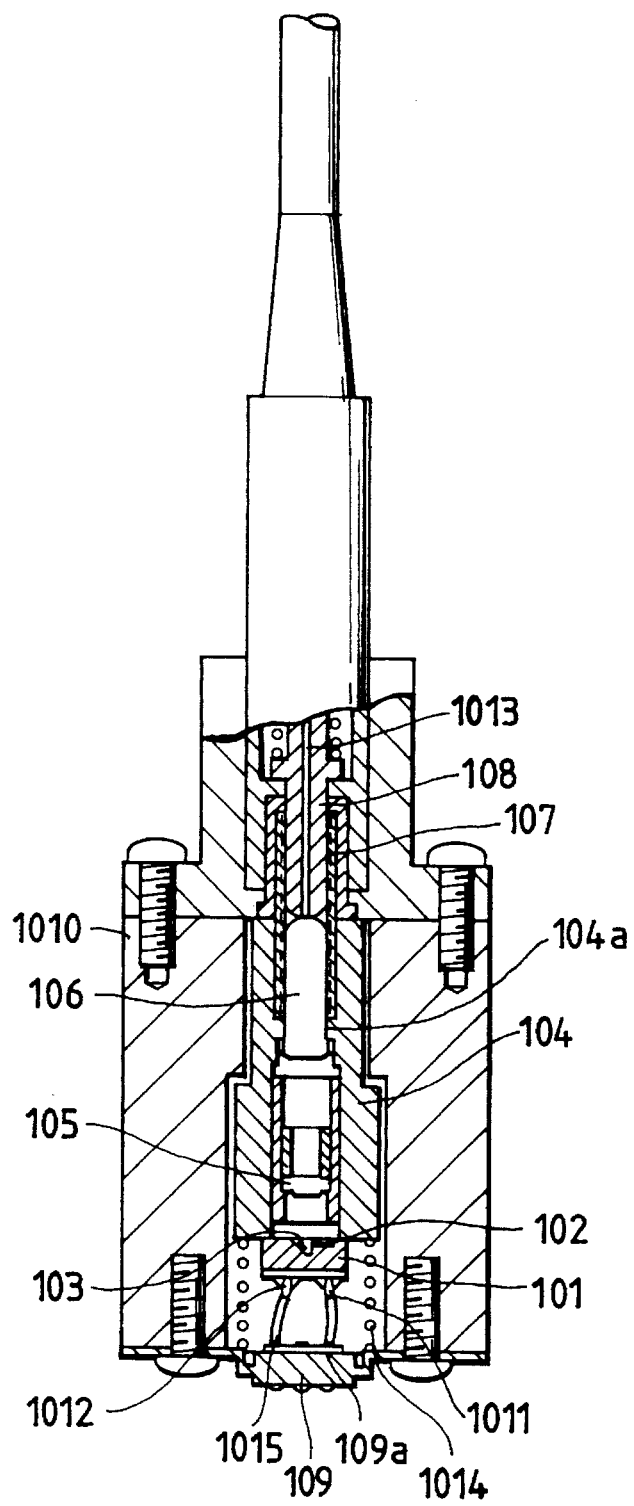
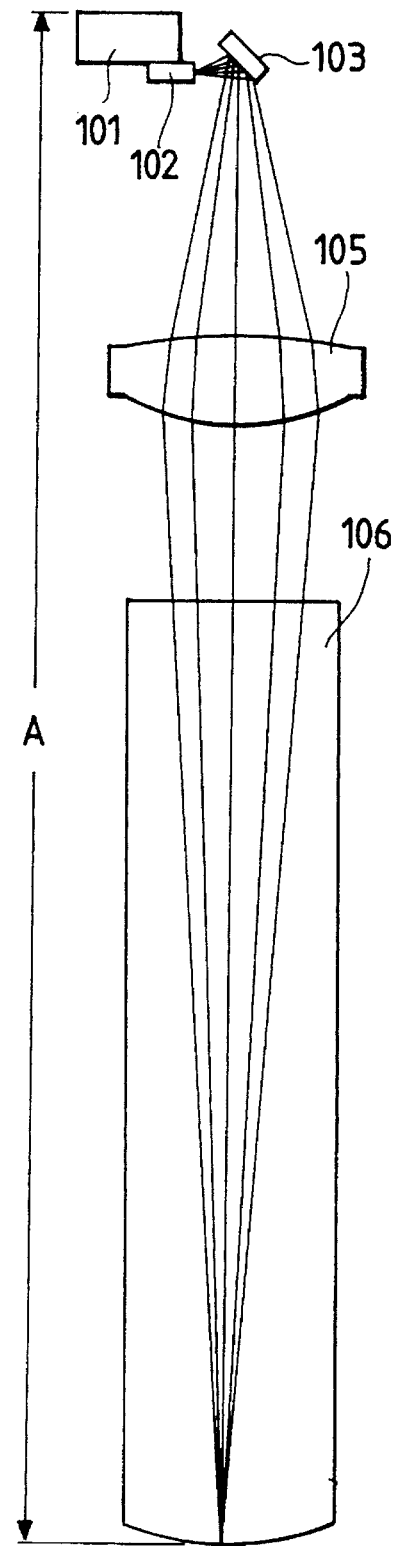

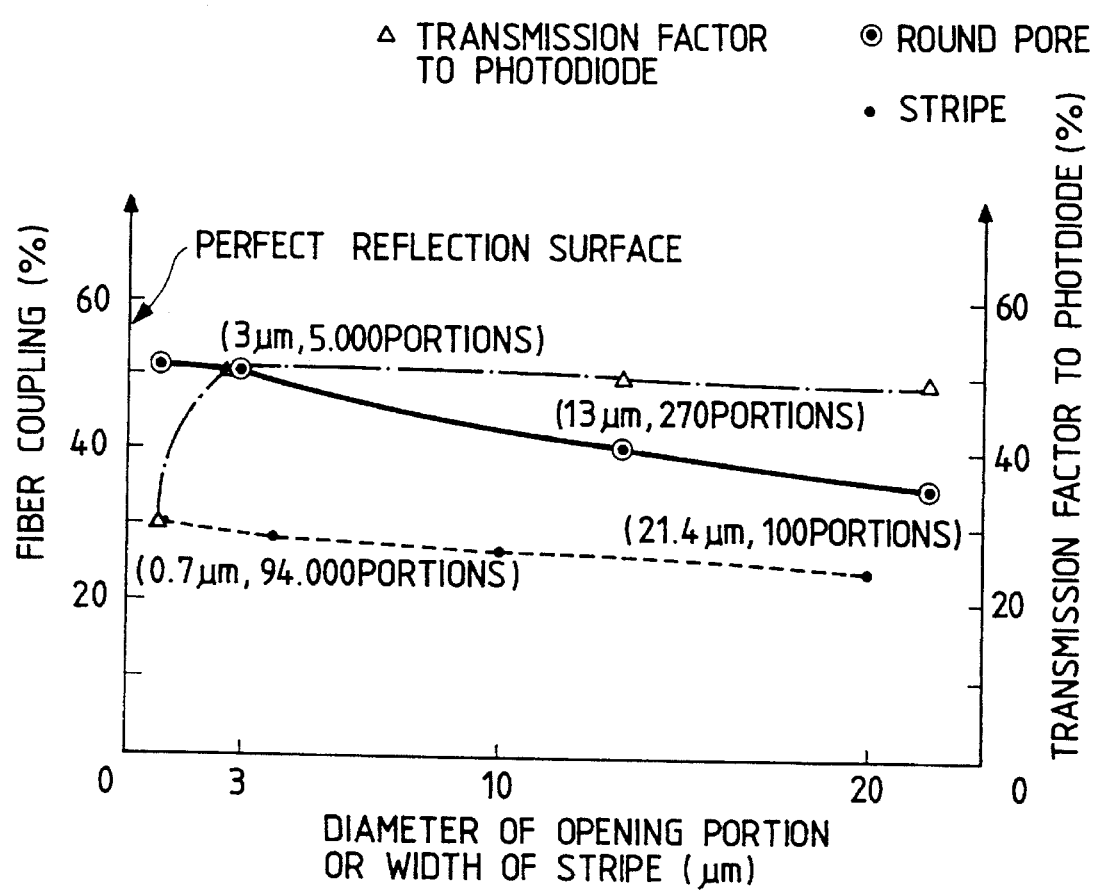

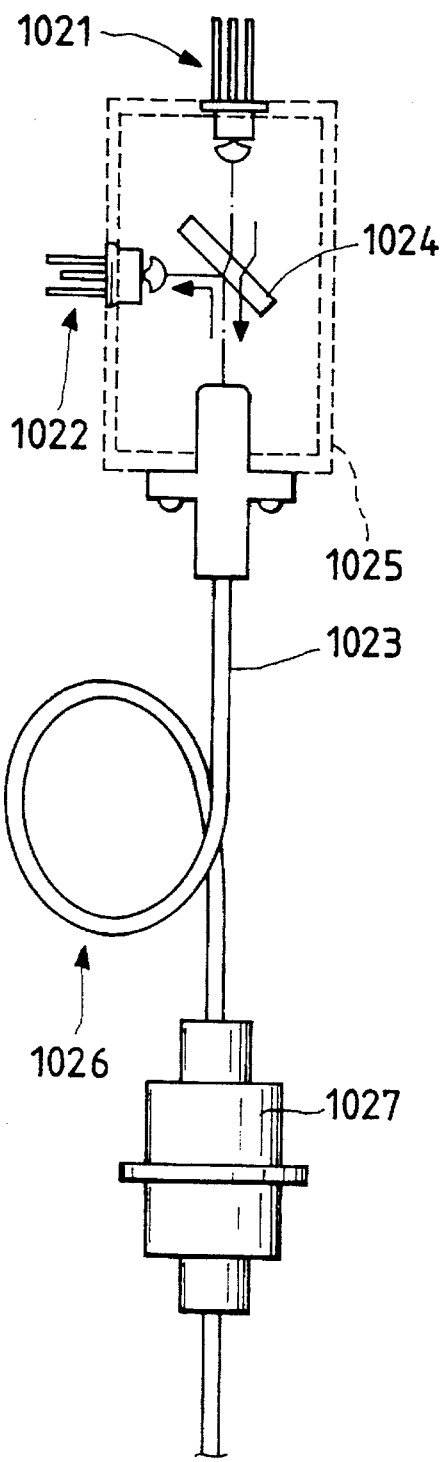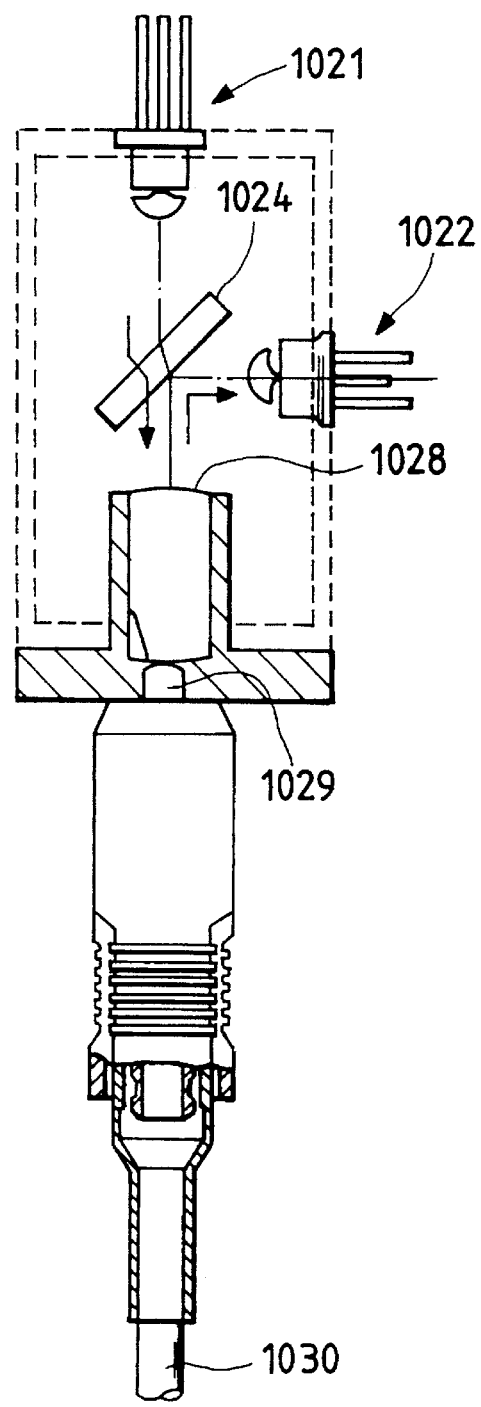

TRANSCEIVER MODULE FOR OPTICAL COMMUNICATION

BACKGROUND OF THE INVENTION

The present invention relates to a transceiver module for optical communication. Particularly, the present invention relates to a transceiver module in which the coupling of a rod lens and a ferrule is improved, and the coupling efficiency of signal light is improved. Also, the present invention relates to a transceiver module for optical communication adapted to subscriber communications using optical fibers, sensing heads, and so on.

Recently, optical communication using optical fibers has come into wide use rapidly, and has begun to be brought into personal use such as telephone and facsimile, and into mass media such as television information. In addition, also in enterprises, there has come into use such an optical LAN (Local Area Network) system that terminal equipments are disposed in respective factories, respective sections and so on, and the equipments are connected through optical fibers, so that information can be exchanged in real time. In such a case, it has been a problem for wider use to realize a transceiver module constituted by a fiber coupler and so on for coupling an optical fiber with a light-emitting element and a light-receiving element of a terminal equipment installed in each home or the like, the module having a high efficiency of coupling and being reduced in cost.

A system called a pig tail type as shown in FIG. 17, or a system for bringing a lens and a ferrule of zirconia into physical contact as shown in FIG. 18, has been considered as an optically coupling circuit.

In a transceiver module of the pig tail type as shown in FIG. 17, a light-emitting element 1021, a light-receiving element 1022 and a coupling optical fiber 1023 are attached to a casing 1025 so that the the light-emitting element 1021 and the light-receiving element 1022 are coupled with the top end of the coupling optical fiber 1023 through a half mirror 1024 respectively. This coupling optical fiber 1023 attached to the casing 1025 forms a loop 1026 in order to prevent the coupling optical fiber 1023 from being broken off by bending. The coupling optical fiber 1023 is coupled with an external optical fiber line for transmission through an adaptor 1027.

On the other hand, in a transceiver module of the system for bringing a lens and a ferrule into physical contact as shown in FIG. 18, a light-emitting element 1021 and a light-receiving element 1022 are attached to a casing 1025 so that the light-emitting element 1021 and the light-receiving element 1022 are optically coupled with a lens 1028 through a half mirror 1024. A ferrule 1029 consisting of zirconia is also brought into physical contact with the top end of the lens 1028. Accordingly, if the top end of an optical fiber 1030 is inserted into the ferrule 1029 from the outside, the optical fiber 1030 can be coupled. The abutment surfaces of the lens 1028 and the zirconia ferrule 1029 are ground into convex spherical surfaces respectively in order to obtain physical contact.

In the above-mentioned pig tail type, the coupling optical fiber 1023 between the adaptor 1027 and the casing 1025 is apt to be broken when the coupling optical fiber 1023 is bent into an S-shape. It is therefore necessary to make the coupling optical fiber 1023 into the loop 1026 to couple the casing 1025 and the adaptor 1027. Accordingly, there is a problem that a space for the loop is required so that the module is made large.

Further, there is a problem that the number of parts such as the coupling optical fiber, the adaptor and so on becomes so large as to increase the cost.

On the other hand, in a module in which a lens and a zirconia ferrule are brought into physical contact, the module can be made small in size and in the number of parts. However, a marketed ferrule has a ground surface with a curvature radius R the center of which is deviated. If the center deviation of the ground surface is about 50 μm, there appears a gap between the lens and the core of an optical fiber, so that signal light is reflected on the end surface of the optical fiber. Accordingly, there is a problem that the efficiency of coupling is deteriorated, and this reflected light acts as return light so as to give a noise to a semiconductor laser.

In addition, a change of surrounding temperature makes the lens and the ferrule expand and contract, so as to change this gap. Therefore, there is also a problem that the temperature characteristic of the transceiver module is also deteriorated.

FIG. 19 shows the basic structure of a transceiver module for optical communication, which is constituted by a light-emitting element 1 such as a semiconductor laser for emitting transmission signal light, a light-receiving element 2 such as a photodiode, a phototransistor, or a photocell for receiving detection signal light through a half mirror 8, a coupling lens 3 for connecting the transmission signal light to a light transmission path (not shown) such as an optical fiber, and a monitor light-receiving element 6 for monitoring the quantity of light emission of the light-emitting element 1.

In order to reduce the distance L between the light-emitting element 1 portion and the coupling lens 3 along the axis of a beam emitted from the light-emitting element 1 provided for emitting transmission signal light, there has been proposed a semiconductor laser device for perpendicularly reflecting light emitted from the light-emitting element 1, as described, for example, in Japanese Patent Unexamined Publication No. Hei 5-129711. The structure thereof is shown in FIG. 20.

In FIG. 20, reference numeral 71 designates a heat radiation plate which is formed by plating a surface of a heat-conductive metal plate such as a carbon steel plate, a copper plate, or an aluminum plate with a metal such as gold. A sub-mount 73 is fixed onto an upper surface of the heat radiation plate 71. A semiconductor laser chip 74 is fixed sideways onto an upper surface of the sub-mount 73 so that a laser light beam from the front cleavage surface of the semiconductor laser chip 74 is emitted in a direction substantially parallel to the upper surface of the heat radiation plate.

The rear cleavage surface of the semiconductor laser chip 74 is perfectly blocked by a reflection film so that all laser light beams are emitted from the front cleavage surface. On the other hand, a monitor photodiode 77 is mounted to a reflection portion mounting portion 76 within a frame body of a cap substance 72 so that a great part of the laser light beam emitted from the front cleavage surface of the semiconductor laser chip 74 is reflected on a surface of the photodiode 77 so as to go toward a glass plate 78 attached on the cap body 72 and the residual part of the laser light beam is received by the photodiode 77. Thus, the photodiode 77 serves as a laser light reflecting portion and also as a monitor light-receiving element. A current for driving the semiconductor laser device is controlled by the output of the photodiode 77 to attain the stabilization of the laser light beam outputted from the semiconductor laser device.

Also in the case of a transceiver module for optical communication formed by using the semiconductor laser device having the aforementioned structure, as shown in FIG. 19, detection signal light transmitted from the light transmission path is reflected by a half mirror disposed between the light transmission path such as an optical fiber and the reflecting portion (that is, generally, between the coupling lens and the light transmission path) so that the reflected light can be received by a light-receiving element provided separately.

As described above, in the conventional transceiver module for optical communication, the light-receiving element portion is separated by a half mirror or the like in the front of the light transmission path so that a light path different from the path of light emitted from the light-emitting element portion is formed. Accordingly, there arises a problem that the number of constituent parts is increased to thereby bring an increase in the number of assembling steps and an increase in apparatus size.

SUMMARY OF THE INVENTION

It is an object of the present invention to solve the foregoing problems and provide a transceiver module for optical communication by which coupling can be performed efficiently even if the center of R of the convex ground surface of a ferrule is deviated to some extent.

Another object of the present invention is to provide a transceiver module for optical communication in which a reflecting portion for reflecting transmission signal light emitted by a light-emitting element is provided and at the same time a light-receiving element for receiving detection signal light from a light transmission path is provided in the light path of a transmission/detection light beam to thereby form a simple structure with no use of separating optical systems such as a half mirror and so on.

A still another object of the present invention is to prevent noise from being produced because detection signal light reflected at a reflecting portion is reflected both at a light-emitting element and at the reflecting portion again, connected to a light transmission path and returned to a transmission portion which has emitted the detection signal light, in the case where the reflecting portion for reflecting the beam emitted from the light-emitting element is used also as a light-receiving element for receiving the detection signal light.

A further object of the present invention is to reduce polarization dependence caused by detection signal light obliquely incident upon the light-receiving element as sufficiently as possible in the case where the reflecting portion for reflecting the beam emitted by the light-emitting element is used also as a light-receiving element for receiving the detection signal light. Particularly in the case of a subscriber communication network using optical fibers, detection characteristic independent of the direction of polarization is required because the plane of polarization in the optical fiber rotates.

A still further object of the present invention is not only to eliminate the polarization dependence of detection signal light in the case where the reflecting portion for reflecting the beam emitted by a light-emitting element is used also as a light-receiving element for receiving the detection signal light but also to correct astigmatism caused by the astigmatic difference of a semiconductor laser which is apt to occur in the case where the semiconductor laser is used as the light-emitting element.

A transceiver module for optical communication according to a first aspect of the present invention, comprises a light-emitting element, a light-receiving element and a rod lens. Light from the light-emitting element is condensed on the top end of the rod lens. A ferrule of an optical fiber is brought into physical contact with the top end surface of the rod lens so as to couple the light-emitting element and the light-receiving element with the optical fiber. The rod lens is held by a support supported by a spring member on a housing through a cover electrode, and the outer diameter of the rod lens is formed to be substantially equal to the outer diameter of the ferrule. An opening portion is provided in the housing so that the top end of the ferrule of the optical fiber can be slidably fitted into one end of a sleeve the other end of which is slidably fitted onto the outer circumference of the rod lens.

Preferably, the light-emitting element and the light-receiving element are held by the support so that the relationship among the light-emitting element, the light-receiving element and the rod lens is always kept fixed.

Preferably, a part of the surface of the light-receiving element is made a reflecting surface, so that a light beam emitted from the light-emitting element is reflected thereon to be thereby condensed into the top end surface of the rod lens, and at the same time detection light from the optical fiber is received by the other portion of the surface of the light-receiving element.

Preferably, the rod lens is formed from glass material the refraction factor of which is not larger than 1.49.

Preferably, the sleeve is a spring sleeve made from phosphor bronze.

Preferably, electrode terminals of the light-emitting element and the light-receiving element are led out to the housing side through the cover electrode.

Preferably, a package mounted with the light-receiving element, and said support are welded air-tightly, and the rod lens and the support are sealed air-tightly.

According to the first aspect of the present invention, a rod lens is held by a support supported by a spring member on a housing through a cover electrode, and is coupled with an optical fiber through a sleeve slidably fitted onto the outer circumference of the rod lens. Accordingly, the center axis of the rod lens and a ferrule can be maintained by a sleeve by pressing forces from the opposed sides even if there is eccentricity in R of the physical contact surface of the ferrule, and physical contact can be obtained on the center axis of the rod lens and the ferrule by the degree of freedom given to the rod lens by the spring member. As a result, there can be obtain a coupling characteristic which is not only so small in reflection loss on the contact surface as to generate no noise in a semiconductor laser, but also stable against a change in room temperature.

The transceiver module for optical communication according to a second aspect of the present invention comprises a light-emitting element for emitting transmission signal light, a coupling lens for connecting the transmission signal light emitted from the light-emitting element to a light transmission path, and a light-receiving element for receiving detection signal light from the light transmission path, wherein the transmission signal light emitted from the light-emitting element is reflected on a surface of the light-receiving element and connected to the light transmission path through the coupling lens.

It is preferable from the point of view of reduction in apparatus size that the aforementioned light-receiving element serves also as a monitor light-receiving element for monitoring the quantity of light emission of the light-emitting element.

It is preferable from the point of view of adjustment of the light-receiving sensitivity of the monitor light-receiving portion and the detection sensitivity of detection signal light that the light-receiving element is formed so that the monitor light-receiving portion and the light-receiving portion for receiving the detection signal light from the light transmission path are provided on one and the same substrate separately from but adjacently to each other.

It is preferable from the point of view of prevention of noise caused by returning of detection signal light that the surface of the light-receiving element is inclined so that the center axis of the beam after the beam emitted by the light-emitting element is reflected by the light-receiving element is shifted from the optical axis of the coupling lens by a value which is not smaller than $\sin^{-1}NA$ where NA represents the numerical aperture of the coupling lens.

In order to attain reflection at the surface of the aforementioned double-use light-receiving element, it is preferable from the point of view of efficient reflection of transmission signal light that a reflection film having reticulated pores or a plurality of point-like reflection films are provided at least on a surface of a detection signal light receiving portion of the light-receiving element.

In order to further reduce polarization dependence, it is preferable from, the point of view of reduction of polarization dependence caused by reflection that an antireflection film is provided at least on a surface of a detection signal light receiving portion of the light-receiving element and that a reflection film having reticulated pores or a plurality of point-like reflection films are provided on the antireflection film.

It is preferable from the point of view of improvement both in fiber coupling efficiency and in transmission factor to a photodiode that each of the reticulated pores or point-like reflection films provided on the surface of the detection signal light receiving portion has a diameter in a range of from half of the wave length of the detection signal light to five times the wave length.

It is preferable from the point of view of reduction in lowering of coupling efficiency to the light transmission path caused by the diffracting action that the pores of the reflection film having the reticulated pores or the plurality of point-like reflection films are provided irregularly.

It is more preferable from the point of view of reduction in polarization dependence that the anti-reflection film is formed so as to be thicker than $\lambda/4$ by a factor of from 5% to 10% when $\lambda$ represents the wave length of the transmission/detection light.

It is preferable that a cover glass as another means for eliminating polarization dependence is provided between a surface of the light-receiving element and the light transmission path and inclined so that the polarization of the detection signal light due to transmission through the cover glass and the polarization of the detection signal light due to transmission on the surface of the light-receiving element cancel each other.

It is further preferable from the point of view of elimination of astigmatism based on the astigmatic difference of the light-emitting element that a cover glass inclined to cancel the astigmatic difference of the light-emitting element is provided between the light-emitting element and the light transmission path.

It is preferable from the point of view of correction of polarization caused by reflection at an inclined surface and transmission and from the point of view of correction of astigmatism based on the astigmatic difference of the light-emitting element that a cover glass is provided between a surface of the light-receiving element and the light transmission path and inclined so that not only the polarization of the detection signal light due to transmission through the cover glass and the polarization of the detection signal light due to reflection at the surface of the light-receiving element cancel each other but also the astigmatic difference of the light-emitting element and the polarization of the detection signal light due to transmission through the cover glass cancel each other.

Further, preferably, the cover glass has one surface coated with a material of high refracting index for the wave length $\lambda$ of the transmission/detection light by a thickness of $\lambda/(4n)$ (in which n represents refracting index at the wave length $\lambda$ of the transmission/detection light) and the other surface coated with an antireflection film. As a result, high polarization dependence can be provided even in the case where a cover glass formed of glass of small refracting index is used, so that it is possible to cancel polarization caused by reflection at the inclined surface.

According to the second aspect of the present invention, a beam emitted from a light-emitting element is reflected on the surface side of a light-receiving element, so that the reflected light is connected to a light transmission path such as an optical fiber or the like through a coupling lens. Accordingly, the distance between the light-emitting element mount surface and the light transmission path can be shortened, so that not only a small-sized transceiver module for optical communication can be produced but also the emission beam can be connected to the light transmission path efficiently. As a result, a special light-receiving element and a half mirror are not required for receiving detection signal light, so that a small-sized simple structure is provided.

Furthermore, a time-division direction control method for performing transmission and detection alternately in terms of time is used in optical communication, so that the light-receiving element can serve also as a monitor light-receiving element for monitoring the emission output of the light-emitting element to control the output. Accordingly, further reduction in apparatus size can be achieved.

In the light-receiving element, the monitor light-receiving portion and the detection light-receiving portion are formed separately, so that signal processing can be performed by means of changing the amplification factor of an amplifier or by like means even in the case where the power of the transmission signal light is about 1000 times different from the power of the detection signal light.

Further, the reflecting portion on the surface side of the light-receiving element is inclined so that the axis of the reflected emission beam is shifted from the optical axis of the coupling lens by a value not smaller than $\sin^{-1}NA$ where NA represents the numerical aperture of the coupling lens. Accordingly, because light returned to the reflecting portion by reflecting the detection signal light at the reflecting portion and then reflecting it at the light-emitting portion goes to the outer side of the coupling lens, the reflected light is not returned to the light transmission path so that noise can be prevented. That is, reflected light obtained by reflecting detection signal light passing through the outermost end side of the coupling lens at the reflecting portion, reflecting it at the light-emitting element and reflecting it at the reflecting portion again is formed just so as to pass through the outside of the coupling lens. On the other hand, reflected light obtained by reflecting detection signal light passing through the opposite end side of the coupling lens at the reflecting portion and reflecting it at the light-emitting element goes away greatly, so that the reflected light never enters into the coupling lens. Accordingly, detection signal light never returns to the light transmission path by reflection. On the other hand, if the inclination of the reflecting portion is set to be sufficiently larger than ½sin$^{-1}$NA with respect to the angle along the optical axis, the connection of the transmission emission beam to the coupling lens is lowered undesirably. Because the connection also depends on the beam angle of the emission beam, there is generally no problem as long as about 40% of the emission beam can be fetched.

Further, an antireflection film is provided on a surface of the light-receiving element and then a reticulated reflection film or a plurality of point-like reflection films are provided on the antireflection film, so that almost 100% of detection signal light is reflected on the reflection film(s) but almost 100% thereof passes through other portions than the reflection film(s). As a result, even in the case where detection signal light enters into the inclined surface obliquely, there is little influence of polarization caused by entrance into the inclined surface because difference in reflection factor and transmission factor between S polarization and P polarization is small.

Further, the reflection films are provided irregularly. Accordingly, the spot of transmission signal light can be prevented from being divided by diffraction, so that efficiency in coupling to the light transmission path can be improved.

Further, even in the case where the antireflection film or the like is not provided on the surface of the light-receiving element, detection signal light is made to enter into the cover glass obliquely by adjusting the angle of the cover glass provided in the surface side of the light-receiving element, so that difference in transmission factor is formed between S polarization and P polarization to thereby generate polarization dependence. The polarization dependence caused by the oblique entrance of the detection signal light into the light-receiving element can be prevented by inclining the cover glass in a direction so that the transmission factor change between S polarization and P polarization on the basis of the cover glass cancels the transmission factor change between S polarization and P polarization caused by the oblique entrance into the surface of the light-receiving element.

Further, astigmatism based on the astigmatic difference of a semiconductor laser used as the light-emitting element can be corrected by changing the direction of the inclination of the cover glass within an x-y plane.

Even in the case of a cover glass of low refracting index, high polarization dependence can be provided by coating one surface of the cover glass with a material of high refracting index for the wave length $\lambda$ of the transmission/ detection signal light by a thickness of $1/(4n)$ in which n represents the refracting index of the material at the wave length $\lambda$, so that the polarization dependence thereof can cancel the polarization dependence of the light-receiving element surface.

BRIEF DESCRIPTION OF THE DRAWINGS

FIG. 1 is an explanatory sectional view of a transceiver module for optical communication according to a first embodiment of the present invention, FIG. 2 is a diagram for explaining the state where light from a light-emitting element is condensed onto the top end surface of a rod lens, FIG. 4(b) showing the case where the spherical surfaces are not eccentric and the respective centers thereof coincide with the center axis, FIG. 5(b) showing the state where a physical contact state can be obtained when a pressing force is exerted onto the rod lens and the ferrule, FIG. 15 is a graph showing the relationship between the size of opening portions provided in the reflection film and the coupling to the light transmission path, FIG. 17 is an explanatory diagram illustrating a pig tail type as an example of a conventional transceiver module, FIG. 18 is an explanatory diagram illustrating an example of a conventional transceiver module in which a lens and a ferrule are brought into physical constant.

DETAILED DESCRIPTION OF THE PREFERRED EMBODIMENTS

Figure 3:
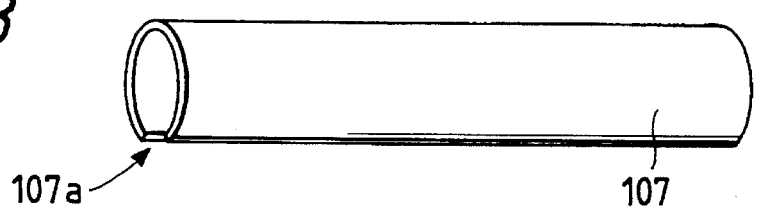
FIG. 3 is an explanatory diagram of an example of a sleeve.

Preferred embodiments of the present invention will be describedn with reference to the drawings.

First, a first embodiment of the present invention will be described with reference to the drawings. FIG. 1 is a sectional view of the first embodiment of the transceiver module according to the present invention.

In FIG. 1, a light-emitting element 102, for example, constituted by a laser chip, and a light-receiving element 103, for example, constituted by a photodiode, are mounted on a package 101. The light-receiving element 103 receives detection signal light through an aspherical lens 105 and a rod lens 106 held in a through hole provided in a support 104. At the same time, light from the light-emitting element 102 is reflected on the surface of the light-receiving element 103, so that the transmission signal light is introduced into the through hole provided in the support 104. The aspherical lens 105 and the rod lens 106 are held in the through hole, and these two lenses condense the transmission signal light from the light-emitting element 102 onto the top end surface of the rod lens 106 on the optical fiber connection side.

An electrode terminal 1011 for inputting a driving signal for driving the light-emitting element 102 and an electrode terminal 1012 for outputting a detection signal received by the light-receiving element 103 are led out to a housing 1010 side through a cover electrode 109 respectively. The electrode terminals for the respective elements are once connected to a base portion 109a of the cover electrode 109 through a lead wire 1015, passed through the cover electrode 109, and led out to the housing 1010 side, so that the degree of freedom in the direction perpendicular to the axis of a sleeve 107 can be given to the support 104, and the rod lens can be pressed onto a ferrule 108.

In this embodiment, a beam is emitted in the horizontal direction from the light-emitting element 102. The beam is reflected on the surface of the light-receiving element 103 which is disposed so as to be inclined at an angle of about 30° with respect to the horizontal direction. The package 101, the aspherical lens 105 and the rod lens 106 are fixed to the support 104 so that the reflected beam is condensed by the aspherical lens 105 onto the top end surface of the rod lens 106 on an optical fiber 1013 side. Since these parts are fixed integrally, physical contact with a core of the optical fiber can be obtained simply, as will be described later.

FIG. 2 shows the relationship in which a beam emitted from the light-emitting element 102 is condensed onto the top end of the rod lens 106. If a system in which about half of transmission signal light emitted from the light-emitting element 102 is reflected on the light-receiving element 103 is used as is in this embodiment, it is not only possible to attain the miniaturization of the module, but also it is possible to make optical systems axial to thereby bring the optical systems into physical contact easily. Further, since the light-receiving element 103 is on the optical axis of detection/transmission signal light, it is not necessary to use another optical system such as a half mirror, so that it is possible to simplify elements. In this case, in a preferable structure, the surface of the light-receiving element 103 used as a reflecting surface is provided with a reflecting film made from a metal film such as Au or Al, a number of small holes are provided in the reflecting film so as to expose an antireflection film under the reflecting film, and about 50% of the surface area is covered with the reflecting film. Since pulses are usually used as detection/transmission signal light in a time division system in optical communication, such a structure performs detection and transmission alternately on the light-receiving element. Accordingly, it is also possible to monitor the strength of transmission signal light by the light-receiving element 102. Accordingly, the light-receiving element 102 can act also as a monitoring light-receiving element, so that it is possible to further simplify elements. In the light-receiving element 102, a light-receiving element for monitoring an emitted beam may be provided at a position different from but adjacent to a light-receiving element portion for detection signal light.

The rod lens 106 is formed so that its outer diameter is formed so as to be substantially equal in size (for example, 2.5 mm) to the outer diameter of the ferrule 108 of the optical fiber 1013, and the rod lens 106 is fixed at its one end to the support 104 so as to be coaxial with a beam from the light-emitting element 102. The words "substantially equal in size" means such a size that each of the rod lens 106 and the ferrule 108 can be slidably fitted into the inner diameter of the sleeve 107 having a slit 107a (FIG. 3). The end surface of the rod lens 106 on the connection side with the optical fiber 1013 is ground into a convex spherical shape the curvature radius of which is about 20 mm, so as to be brought into physical contact with the top end surface of the ferrule 108 of the optical fiber 1013 ground into a convex spherical shape in the same manner. For example, the sleeve 107 consisting of phosphor bronze and having the slit 7a as shown in FIG. 3 is fitted onto the outer circumference of the rod lens 106, so that the sleeve 107 makes the center axis of the rod lens 106 coincide with that of the ferrule 108 on the top end of the optical fiber 1013.

For example, the sleeve 107 is about 0.25 mm thick and about 12 mm long, and is provided with the slit 107a, as shown in FIG. 3. For example, the sleeve 107 is formed so that the inner diameter is 2.485 mm in a free state, and the rod lens 106 and the ferrule 108 are formed to have the same outer diameter 2.5 mm. Accordingly, if the respective top ends of the rod lens 106 and the optical fiber 1013 are inserted to the opposite ends of the sleeve 107, the rod lens 106 and the optical fiber 1013 are connected so as to be kept coaxial. Although each of the respective top ends of the rod lens 106 and the ferrule 108 is ground into a convex spherical surface the curvature radius of which is about 20 mm as mentioned above, the respective centers of the spherical surfaces are apt to be shifted from each other by about 40 to 50 μm. That is, such ferrules made from zirconia or the like may be produced by mass production so that they are available on the market. While each of the ferrule and the core are formed accurately in the degree of coaxialness not more than 1.4 μm, the top end is ground into a spherical surface by mechanical working, so that the spherical surface is apt to be eccentric. According to the transceiver module of the present invention, even if the spherical surface of the ferrule is eccentric, it is possible to obtain a coupling characteristic of a good physical contact between the rod lens and the ferrule on the center axis. The operation will be described with reference to FIGS. 4 and 5.

Figure 4A:
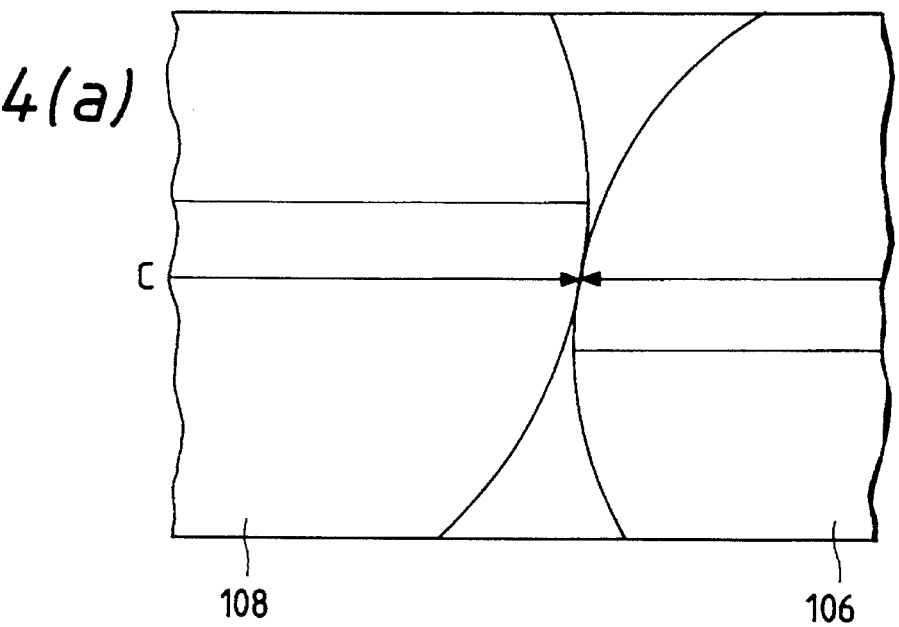
FIGS. 4(a) and 4(b) are explanatory diagrams of the contact surfaces of a rod lens and a ferrule, FIG. 4(a) showing an example in which the respective spherical surfaces of the rod lens and the ferrule are eccentric in different direction with respect to the center axis.
Figure 4B:
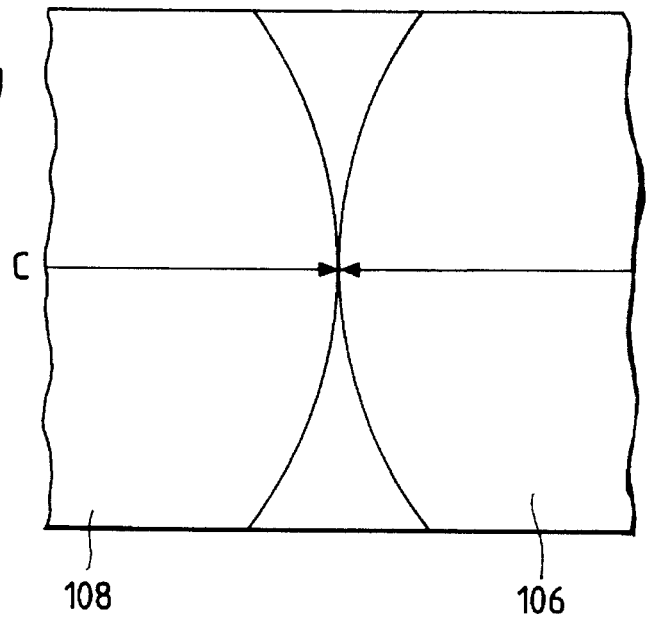
Figure 5A:
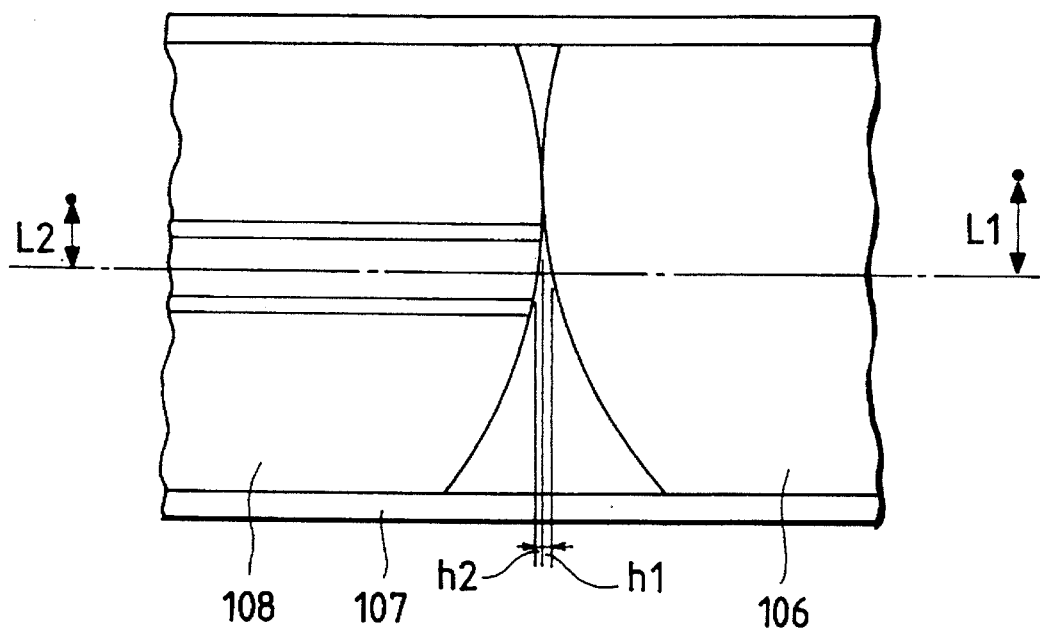
FIGS. 5(a) and 5(b) are explanatory diagrams illustrating the physical contact state between a rod lens and a ferrule in a sleeve, FIG. 5(a) showing an example in which the respective spherical surfaces of the rod lens and the ferrule are eccentric in the same direction with respect to the center axis.
Figure 5B:
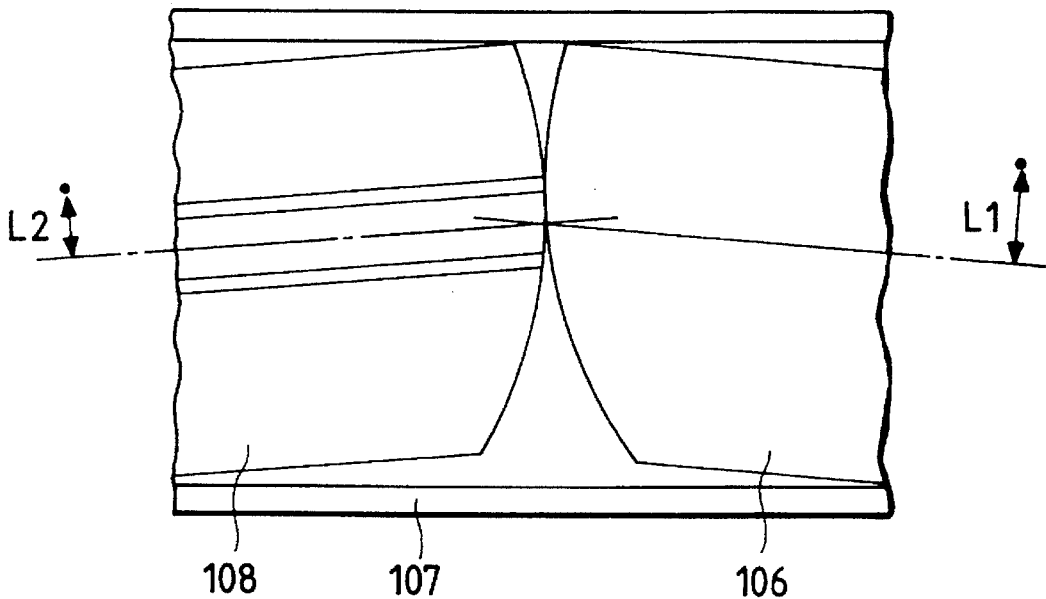

As shown in FIGS. 4(a) and 4(b), in the case where the respective centers of the ground surfaces of the ferrule 108 and the rod lens 106 are shifted in the opposite directions with respect to the center axis C respectively (refer to FIG. 4(a)), physical contact is obtained almost on the center axis. In the case where the centers of the ground surfaces coincide with the center axis of the ferrule (refer to FIG. 4(b)), physical contact is obtained on the center axis, so that the coupling characteristic is improved. However, as shown in FIG. 5(a), in the case where the respective ground surfaces of the ferrule 108 and the rod lens 106 are eccentric in the same direction, gaps $h_1$ and $h_2$ are respectively produced on the center axis of the rod lens 106 and the ferrule 108 where light is transmitted. However, according to the present invention, the rod lens 106 is supported by a spring member 1014, and at the same time, the rod lens 106 and the ferrule are slidably fitted into the springy sleeve 107 and pressed from the opposite sides by the force of about 1 kgf. Accordingly, as shown in FIG. 5(b), the sleeve 107 is pressed so as to be spread slightly, so that the rod lens 106 and the ferrule 108 are brought into physical contact at their respective center axes. The coupling characteristic between the optical fiber and the light-receiving element is improved. In addition, the gaps on the center axis are not changed even if the room temperature varies, so that the temperature characteristic is also improved.

Figure 6:
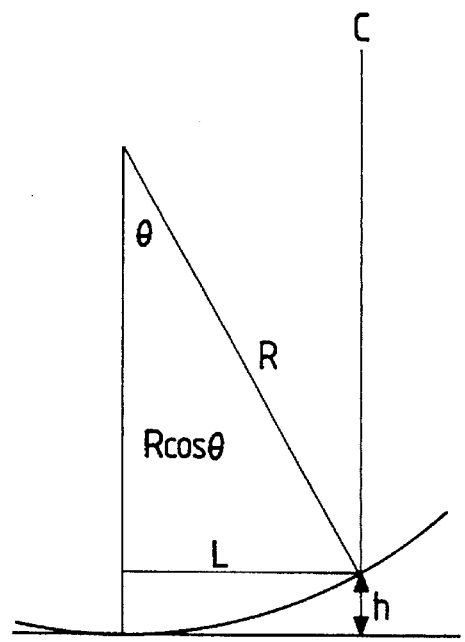
FIG. 6 is an explanatory diagram illustrating the relationship between the eccentricity of the convex spherical surface and the gap.

Next, the operation will be described in detail by a specific example. FIG. 6 shows the relationship between the radius R of a spherical surface, its eccentricity L, its gap h, and the angle θ of the eccentricity. Used are the rod lens 106 and the ferrule 108, in which the outer diameter of each of the rod lens 106 and the ferrule 108 is 2.5 mm, the eccentricity $L_1$ of the ground surface of the rod lens 106 is 50 μm, the eccentricity $L_2$ of the ferrule 108 is 40 μm (refer to FIG. 6 about the eccentricity L), and the curvature radius R of each ground surface is 20 mm. Used is the sleeve 107 which is 14 mm long, which is made from phosphor bronze, which has an inner diameter 2.485 mm in a state of free, and which is 0.25 mm thick. Let the pressing force of the ferrule be 1 kgf. Assume that the gap between the contact plane and the center axis of the rod lens 106 is $h_1$, and that the gap between the contact plane and the center axis of the ferrule 108 is $h_2$ (refer to FIG. 5(a)). Then, the gap $h_1$ between the contact plane and the center axis of the rod lens 106 can be expressed as follows:

$$\begin{aligned} h_1 &= R - R\cos(\sin^{-1}(L_1/R)) \\ &= 20 - 20\cos(\sin^{-1}(0.05/20)) \\ &= 0.0000625 \text{ mm} \\ &= 0.0625 \text{ μm} \end{aligned}$$

The gap $h_2$ between the contact plane and the center axis of the ferrule 108 can be expressed as follows:

$$\begin{aligned} h_2 &= R - R\cos(\sin^{-1}(L_2/R)) \\ &= 20 - 20\cos(\sin^{-1}(0.04/20)) \\ &= 0.00004 \text{ mm} \\ &= 0.04 \text{ μm} \end{aligned}$$

If the gap between the rod lens 106 and the ferrule 108 on the center axis is h:

$$\begin{aligned} h &= h_1 + h_2 \\ &= 0.1025 \text{ μm} \end{aligned}$$

In order to make this gap h zero, if the inclination of the rod lens is $θ_1$, and the inclination of the ferrule is $θ_2$:

$$θ_1 = \sin^{-1}(0.05/20) = 0.14°$$

$$θ_2 = \sin^{-1}(0.04/20) = 0.11°$$

Therefore, if the rod lens and the ferrule are inclined by 0.14° and 0.11° respectively, the gap h can be eliminated.

In this embodiment, the sleeve 107 was made from phosphor bronze so as to be springy. Accordingly, if a pressing force of about 1 kgf was added to the rod lens 106 and the ferrule 108, the rod lens 106 and the ferrule 108 were inclined, and the diameter of the sleeve was increased so that the rod lens 106 was brought into contact with the core of the optical fiber in the ferrule 108. As a result, physical contact almost without any gap h could be obtained, so that the reflection on the end surface of the rod lens was reduced from 3% to 0.01%. In the above example, since the length of the sleeve is 14 mm, the inner diameter of the sleeve is increased by 17 μm if the rod lens is inclined by 14°.

Since the refraction factor of the core of the optical fiber is 1.472, it is preferable that glass material having a refraction factor not more than 1.49 is used as the rod lens. This is because glass having a refraction factor smaller than 1.472 cannot be obtained, and the reflection is larger as the refraction factor is larger. For example, as such glass, the glass of trade name BK10 (refraction factor n=1.485) made by SCHOTT Co. (Germany) may be used.

Figure 7:
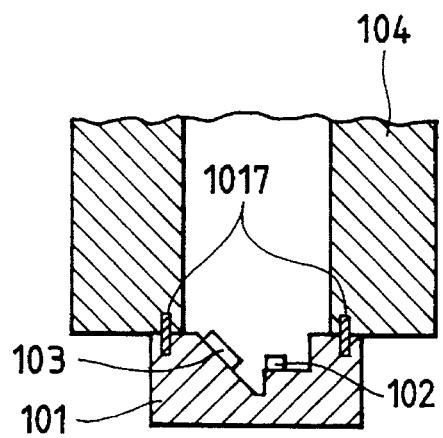
FIG. 7 is an explanatory sectional view illustrating the connection state between the package and the support in the transceiver module for optical communication according to the present invention.
Figure 8:
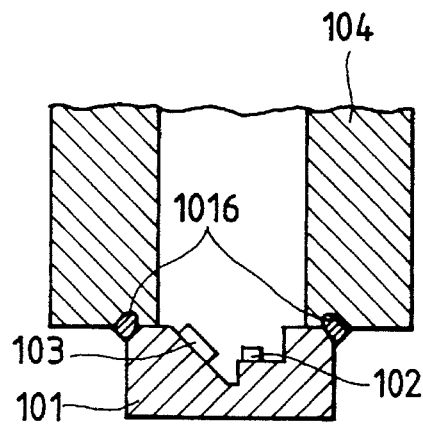
FIG. 8 is an explanatory sectional view illustrating the connection state between the package and the support in the transceiver module for optical communication according to the present invention.

Further, the package 101 and the support are formed by resistance welding of a welded portion 1017 as shown in FIG. 7 or by continuous YAG welding of a welded portion 1016 as shown in FIG. 8, and the rod lens 106 and the support 104 are air-tightly sealed (hermetic seal) with a seal portion 104a. In this case, since the inside of the support becomes perfectly air-tight, it is possible to improve the environmental reliability of the aspherical lens 105, the light-emitting element 102 and the light-receiving element 103.

The welding is not limited to such resistance welding and YAG welding but any welding may be used so long as it can perform air-tight welding.

According to the first embodiment of the present invention, since a rod lens is held by a support supported by a spring member, and the rod lens and a ferrule of an optical fiber are held by a springy sleeve, the rod lens and a core of the optical fiber are brought into physical contact by a force to press them from the opposite sides even if there is eccentricity in each of the spherical ground surfaces respectively formed on the contact surfaces of the rod lens and the ferrule. It is therefore possible to obtain a transceiver module for optical communication in which the efficiency of coupling is superior.

In addition, since physical contact is obtained in the core portion, the characteristic of coupling is not changed even if the surrounding temperature varies. It is therefore possible to obtain a transceiver module for optical communication in which the temperature characteristic is superior.

Further, part of the surface of a light-receiving element is used as a reflecting surface to reflect light from a light-emitting element while the light-receiving element receives detection light from the optical fiber, so that it is possible to reduce the number of parts. In addition, the light-emitting element, the light-receiving element, an aspherical lens and the rod lens are fixed to the support, so that light from the light-emitting element is condensed into a fixed position. Accordingly, it will do to perform centering upon only the optical fiber and the whole of the assembly, and it is possible to obtain a high efficiency of coupling only by pressing the optical fiber.

Figure 9:
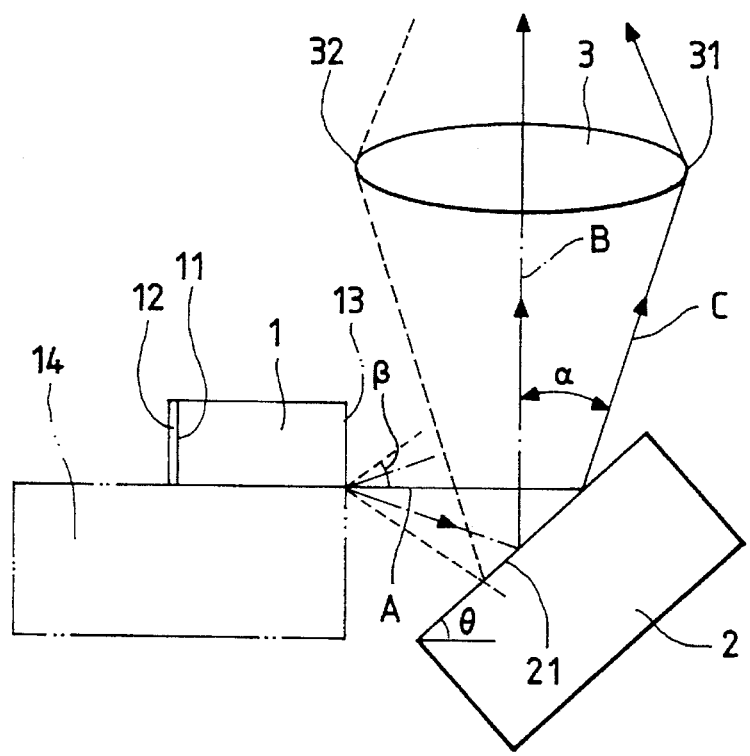
FIG. 9 is a schematic explanatory view of a transceiver module for optical communication according to a second embodiment of the present invention.
Figure 10:
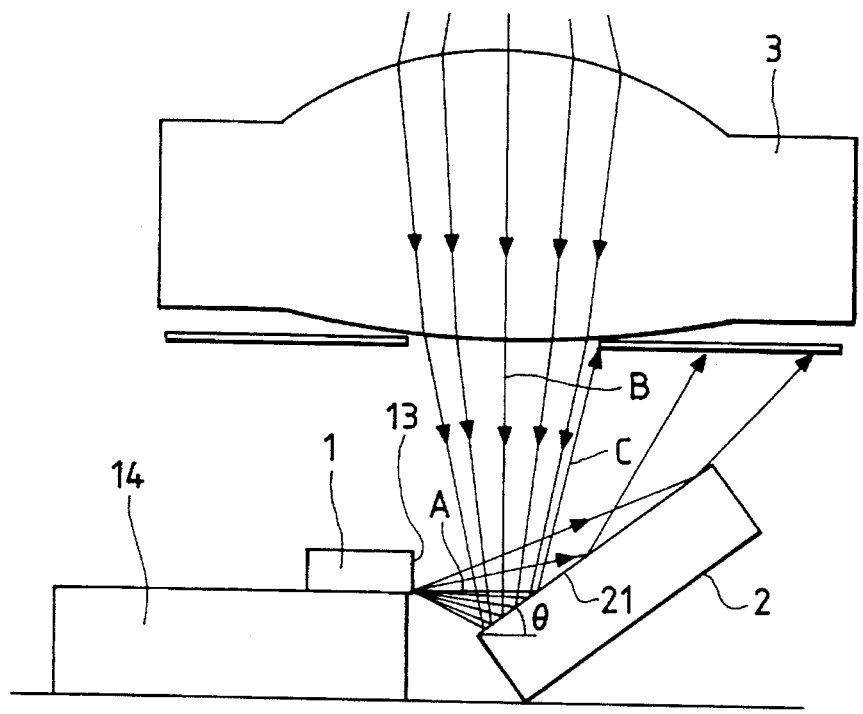
FIG. 10 is a view for explaining the condition of reflection of detection signal light in the transceiver module for optical communication according to the present invention.
Figure 11:
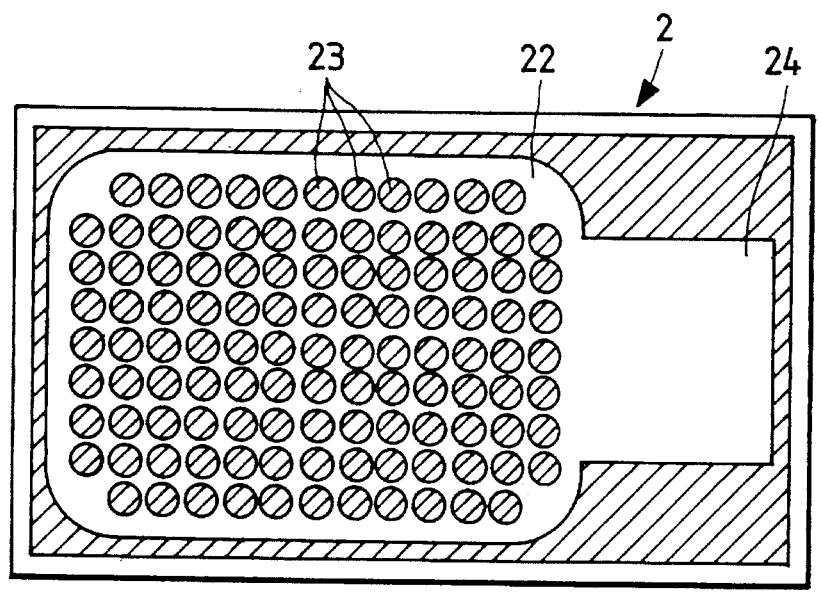
FIG. 11 is an explanatory plan view of a light-receiving element used in the transceiver module for optical communication according to the present invention.
Figure 12:
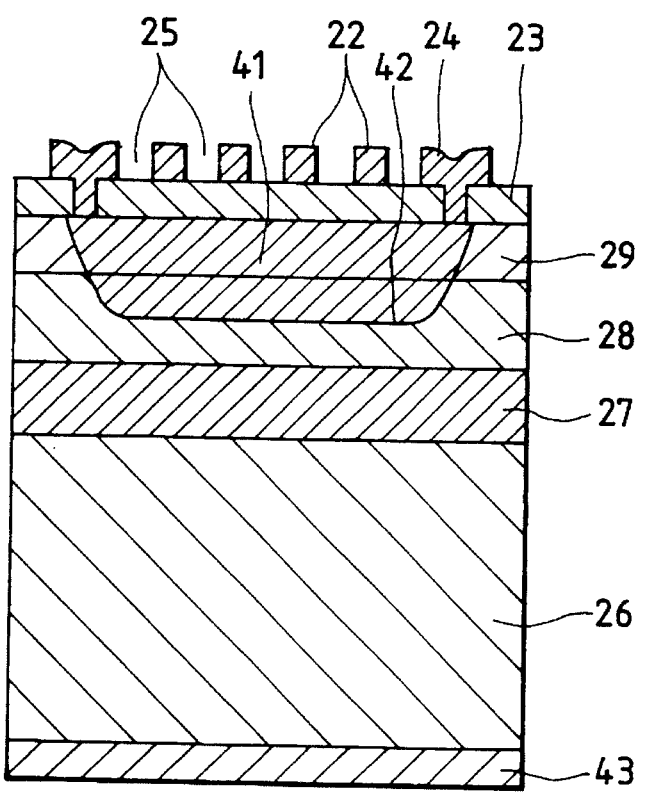
FIG. 12 is an explanatory sectional view of the light-receiving element depicted in FIG. 11.
Figure 13:
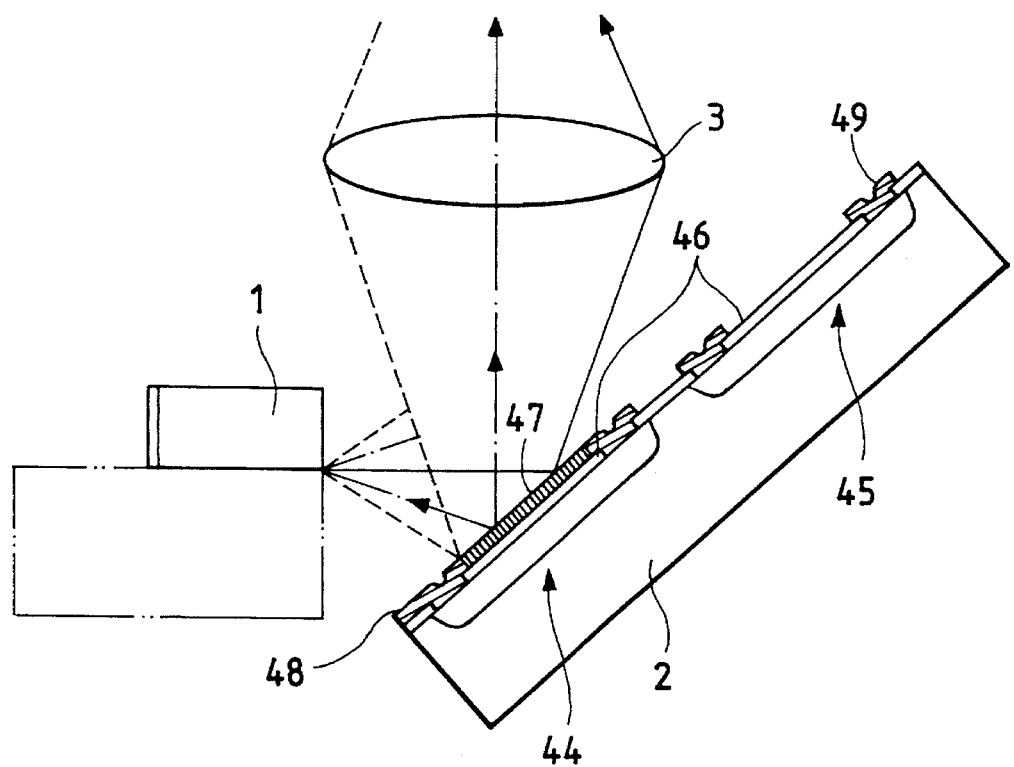
FIG. 13 is an explanatory view of a transceiver module for optical communication according to a third embodiment of the present invention, in which the light-receiving element portion is modified.

FIG. 9 is a schematic explanatory view showing a second embodiment of a transceiver module for optical communication according to the present invention; FIG. 10 is a view for explaining the light path of the reflected light of detection signal light; FIG. 11 is a plan view of an example of the light-receiving element; FIG. 12 is an explanatory sectional view thereof; and FIG. 13 is a view for explaining the inclination of a cover glass disposed between the light-receiving element and the coupling lens.

In FIG. 9, reference numeral 1 designates a light-emitting element such as a semiconductor laser chip or the like fixed onto a sub-mount 14; 2, a light-receiving element such as a photodiode, a phototransistor or the like; and 3, a coupling lens for condensing an emission beam to connect transmission signal light to a light transmission path such as an optical fiber or the like. In the surface side of the light-receiving element 2, the emission beam emitted by the light-emitting element 1 is reflected upward, so that the transmission signal light condensed by the coupling lens 3 is connected to a light transmission path such as an optical fiber or the like (not shown). Detection signal light from the light transmission path is received by the light-receiving element 2 through the coupling lens 3, so that a light signal converted into an electric signal is processed electrically or further converted into a voice or the like so as to be used for light communication.

The transceiver module for optical communication according to the second embodiment of the present invention is characterized in that the light-receiving element 2 for receiving detection signal light is disposed in the light path of the transmission signal light and detection signal light and has a reflection portion 21 provided in the surface side thereof for reflecting the transmission signal light. As a result, the distance between the light-emitting element 1 and the coupling lens 3 along the direction of the emission beam can be shortened, so that not only reduction in size is achieved but also a simple structure is achieved with no use of other optical elements such as a half mirror and so on. The embodiment will be described below more in detail with reference to FIG. 9.

A semiconductor laser chip is used as the light-emitting element 1. In this embodiment, the rear cleavage surface 11 of the semiconductor laser chip is blocked by a reflection film 12. Accordingly, all the laser light beam is emitted from the front cleavage surface 13 thereof. The laser light beam is radiated at an angle (β in FIG. 1) of from 20° to 45° around the center axis A of the emission beam, though the angle varies according to the producing process. The laser light beam is generally radiated at an angle of about 30°. The laser light beam may be pulse-modulated by a transmission signal and emitted as intermittent pulses or may be analog-modulated and emitted as a light beam having variable intensity of emission light. For the purpose of optical communication, the laser light beam is generally pulse-modulated before it is used.

In this embodiment, the emission beam is pulse-modulated and transmission and detection are used alternately by time division, so that the light-receiving element serves as a monitor light-receiving element for monitoring the intensity of the emission beam and also as a detection light-receiving element for receiving detection signal light. Accordingly, the laser light beam is reflected at a surface 21 of the light-receiving element 2 so that it goes toward the coupling lens 3 and at the same time a part thereof is transmitted into the light-receiving element 2.

In this embodiment, the center axis A of the emission beam and the optical axis of the coupling lens 3 are arranged so as to be substantially perpendicular to each other, but the reflection surface 21 of the light-receiving element is disposed so that the optical axis B of the coupling lens 3 is not coincident with the beam axis (center axis) C of the emission beam after reflection. That is, the inclination angle of the reflection surface 21 is set so that the angle between the axis C of the emission beam after reflection and the optical axis B of the coupling lens becomes a value of not smaller than $\sin^{-1}NA$ where NA represents the numerical aperture of the coupling lens 3. That is, the reflection surface 21 is inclined so that the angle θ of the reflection surface 21 with respect to the center axis A of the emission beam becomes a value of not larger than $45°-\frac{1}{2}\sin^{-1}NA$. As will be described later, this is because noise is prevented from being generated by reflecting detection signal light at the reflection surface 21, reflecting it at the front cleavage surface 13 of the light-emitting element 1 and returning it to the light transmission path again.

When, for example, a lens having the numerical aperture NA of 0.25 is used as the coupling lens 3, the inclination angle θ of the reflection surface 21 with respect to the horizontal plane is set to be about 45°−7.3°=37.7° because $\frac{1}{2}\sin^{-1}0.25=7.25°$. As a result, light rays C in the center axis of the emission beam just pass through one end portion 31 of the coupling lens 3 and, at the same time, light rays having the beam angle of 29° pass through the opposite end portion 32 of the coupling lens 3, so that light beams in a range of from the center axis of the beam to this lower limit are connected to the light transmission path through the coupling lens 3. Accordingly, light rays emitted upward compared with the center axis A of the emission beam and light radiated downward compared with the beam angle of 29° do not enter into the coupling lens 3, so that the light beams do not serve as transmission signal light. In practice, there is however no problem as long as power of from about ⅙ to about 1/10 of the power of the light-emitting element can be connected to the optical fiber, that is, as long as the quantity light of from about ⅓ to about ⅕ of the quantity of the emission beam can be given as transmission signal light to the coupling lens 3.

For example, as shown in FIG. 11, the surface provided as the reflection surface of the light-receiving element 2 is classified into a portion of reflection film 22 made of a metal film such as Au, Al or the like, and a portion of antireflection film 23 exposed to the outside. The proportion of the reflection film can be adjusted suitably but the proportion of about 50% is generally used as the reflecting portion. The reason why the surface of the light-receiving element 2 is separated into reflection film 22 which has a high reflection factor and antireflection film where reflection is hardly generated will be described later in detail. Briefly, this reason is that the generation of polarization dependence is avoided even in the case where the detection signal light enters into the light-receiving element 2 obliquely. Because the surface of the light-receiving element 2 is treated as described above, part of the beam emitted by the light-emitting element 1 and struck on the reflection film 22 portion is reflected so that light about ¼ of the quantity of the emission beam is connected to the coupling lens 3 and goes to the light transmission path as described above. On the other hand, light incident to the antireflection film 23 from the light-emitting element 1 enters into the light-receiving element and is converted into a current so that the intensity of light emitted from the light-emitting element 1 can be monitored. Accordingly, the emission output can be controlled to be kept constant by adjustment of the driving current, or the like.

On the other hand, detection signal light from the light transmission path is condensed by the coupling lens 3. Because the center axis of the detection signal light is made to be coincident with the optical axis of the coupling lens 3, the detection signal light is condensed into the focal point of the coupling lens 3. The detection signal light condensed by the coupling lens 3 is received by the light-receiving element 2 but about half of the detection signal light is reflected toward the light-emitting element 1, reflected at the emission surface of the light-emitting element 1 again and returned to the surface of the light-receiving element because about half of the surface area of the light-receiving element 2 forms the reflection film 22 as described above. As described above, the inclined surface of the surface of the light-receiving element 1 is however inclined so that the center axis C of the emission beam after reflection is shifted from the optical axis B of the coupling lens 3 by a value of $\sin^{-1}NA$. Accordingly, when the detection signal light reflected by the light-emitting element 1 is reflected at the surface of the light-receiving element 2 again, all the reflected light goes to the outside of the coupling lens 3 so that the reflected light never returns to the light transmission path as shown in FIG. 10. On the other hand, the detection signal light transmitted into the inside of the light-receiving element 2 is converted into an electric signal by the light-receiving element 2, subjected to signal processing and outputted.

Well, the detection signal light is received by oblique entrance into the surface of the light-receiving element 2. For example, light emitted from the semiconductor laser chip is only linear polarization light always having an electric vector perpendicular to the paper surface of FIG. 9, so that the reflection factor is kept constant even in the case where the light is reflected at the inclined surface. The plane of polarization however rotates when the detection signal light propagates in the light transmission path such as optical fiber or the like, so that the detection signal varies in accordance with the rotation of the plane of polarization when polarization dependence occurs in the detection optical system. It is therefore necessary that the generation of polarization dependence is avoided in order to perform accurate detection. In this embodiment of the present invention, as shown in FIG. 12 which is a sectional explanatory view of the light-receiving element 2, an antireflection film 23 made of silicon nitride or the like is provided on a surface of the light-receiving element 2 and a reflection film 22 having reticulated opening portions 25 is provided on the surface of the antireflection film 23 so that the reflection film 22 reflects transmission signal light and is connected to a p electrode 24 of a photodiode which is the light-receiving element 2. That is, for example, the photodiode comprises an n-type InP substrate 26, an n-type InP buffer layer 27 provided thereon, an about 3 μm-thick n⁻-type InGaAs layer 28 provided thereon, an about 0.7 μm-thick n⁻-type $In_{1-x}Ga_xAs_yP_{1-y}$ ($0 \leq x \leq 0.25$, $0 \leq y \leq 0.55$) window layer 29 provided thereon, a p⁺-type diffusion layer 41 provided, and a pn junction 42 formed. Further, an n electrode 43 is formed in the rear side of the substrate 26.

The structure of the light-receiving element 2 is not limited to the specific embodiment. Any photodiode constituted by other materials may be used or the conduction type may be reversed between the n type and the p type. Alternatively, any phototransistor or the like may be used. The feature of the light-receiving element according to the present invention is in that an antireflection film 23 is provided on the surface of the light-receiving element and a reflection film 22 having reticulated opening portions (patterns) 25 is further provided on the surface of the antireflection film 23. The opening portions 25 may be provided by patterning after the reflection film 22 is provided on the antireflection film by vapor deposition, sputtering or the like. Alternatively, the reflection film 22 having reticulated patterns may be provided so as to overlap the surface of the antireflection film 23. Alternatively, a structure in which point-like reflection films are provided may be used. Preferred examples of the reflection film 22 include metals of high reflection factor such as Au (98%) Al (92%) and so on. The antireflection film 23 is preferably made of a dielectric film having a thickness of ¼ wave length, two layers of dielectric laminates different in refracting index, or the like, to avoid the occurrence of reflection. That is, even in the case of oblique entrance, the influence of polarization can be prevented by the provision of the antireflection film as a perfect reflection film.

When the optical thickness nd (n: refracting index; d: mechanical thickness) of the insulating film 11 is set to nd=327.5 nm, the optical thickness is equivalent to ¼ wave length of the laser light beam having the wave length of 1310 nm. Accordingly, the reflection factor and transmission factor of the photodiode surface at the incident angle of 30° with respect to the laser light beam having the wave length of 1310 nm are as follows.

S polarization
    Reflection factor = 1.6%
    Transmission factor ($Ts$) = 98.4%
P polarization
    Reflection factor = 0.2%
    Transmission factor ($Tp$) = 99.8%

Because the degree of non-polarization can be calculated as represented by $2 \times Tp/(Ts+Tp)$, the degree of non-polarization is $2 \times Tp/(Ts+Tp) = 2 \times 0.998/(0.984+0.997) = 1.0076$, that is, 0.03 dB.

On the other hand, in the case where there is no antireflection film provided, the reflection factor and transmission factor of the photodiode surface at the incident angle of 30° with respect to the laser light beam having the wave length of 1310 nm in the same condition as described above are as follows.

S polarization
    Reflection factor = 31%
    Transmission factor ($Ts$) = 69%
P polarization
    Reflection factor = 21%
    Transmission factor ($Tp$) = 79%

The degree of non-polarization is $$2 \times Tp/(Ts+Tp) = 2 \times 0.79/(0.69+0.79) = 1.07,$$

that is, 0.3 dB. Accordingly, the degree of non-polarization of the detection signal light in the case where there is any antireflection film provided has a sufficiently low value of 11% compared with the degree of non-polarization in the case where there is no antireflection film provided.

The inventors of the present invention have made examination eagerly. As a result, it has been found that in the case of a photodiode inclined with respect to the direction of incidence of light, the degree of polarization is minimized when the optical thickness of the antireflection film is not ¼ of the wave length λ of the laser light beam but a value obtained by increasing the ¼ wave length by about 5–10% because incident light propagates in the antireflection film obliquely and because of the influence of the transparent window layer 29.

That is, it has been found that the reflection factor is minimized when the antireflection film having a thickness obtained by 8% increasing the ¼ wave length is provided, and that it is preferable that the antireflection film having a thickness obtained by increasing the ¼ wave length by about 5–10% near 8% is provided, because the reflection factor is 1.4% when the antireflection film having a thickness of ¼ wave length is provided, the reflection factor is 1.1% when the thickness of the antireflection film is increased by 1.04 times, the reflection factor is 1.0% when the thickness is increased by 1.08 times, and the reflection factor is 1.3% when the thickness is increased by 1.12 times.

On the other hand, with respect to the reflection film 22 having the reticulated opening portions 25 in the surface of the light-receiving surface 21 of the light-receiving element 2, the reflection factor of the surface of the light-receiving element 2 can be set arbitrarily in advance by changing the pore proportion in the reticulated opening portions. When, for example, Au is used as the metal film 22, the reflection factor R of the reticulated patterns having the pore proportion of 50% becomes a sufficient high value represented by R=(98+12)/2=55% because the reflection factor of the laser beam having the incident angle of 60° at Au is 98% and the reflection factor with respect to S polarization at the surface of the light-receiving element 2 including the antireflection film is 12%.

FIG. 13 shows an explanatory view of a third embodiment of the light-receiving element 2. In this embodiment, a light-receiving portion 44 for receiving detection signal light and a monitor light-receiving portion 45 for monitoring the intensity of transmission signal light are provided on the one and the same substrate but separately from each other, so that not only detection signal light and monitor light can be received commonly but also the difference of light-receiving sensitivity based on the difference between the intensity of the transmission signal light and the intensity of the detection signal light can be canceled.

Because the surface of the light-receiving portion 44 for receiving detection signal light is placed within an aperture diaphragm of the coupling lens 3, it is necessary that the beam emitted from the light-emitting element 1 is reflected and connected to the coupling lens 3. An antireflection film 46 made of $SiN_x$ or the like and a reflection film 47 having opening portions and made of Au, Al or the like are provided as described above, so that not only about half of the transmission signal light is reflected toward the coupling lens 3 but also the polarization dependence of the detection signal light is eliminated. On the other hand, it is unnecessary that a reflection film is specially provided in the monitor light-receiving portion 45, because the reflected light of the beam emitted from the light-emitting element 1 is provided in the outside portion of the aperture diaphragm of the coupling lens 3. Further, because there is no detection signal light given to the monitor light-receiving portion 45, there is no relation to polarization so that no antireflection film is required. However, FIG. 13 shows the case where the antireflection film 46 is provided. Further, respective p-side electrodes 48 and 49 are formed separately.

In the aforementioned configuration, the power of transmission signal light emitted by the light-emitting element 1 has a strong value of the order of mW whereas the power of detection signal light received from the light transmission path has a very weak value of the order of μW, so that there is about 1000 times difference therebetween. However, the monitor light and the detection signal light can be subjected to signal processing in a common manner by changing the amplification factors of amplifiers provided separately.

Further, the opening portions of the reflection film 47 shown in FIG. 13 are not formed regularly as shown in FIG. 11 but formed at irregular intervals. The influence of the diffracting action is eliminated by forming the opening portions irregularly, so that improvement in efficiency of coupling to the light transmission path is attained.

Figure 14A:
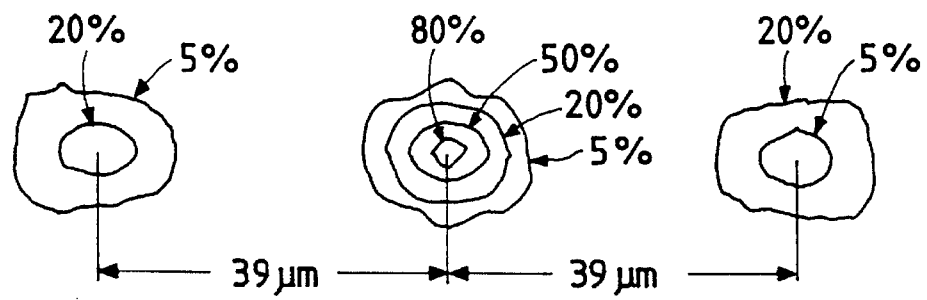
FIGS. 14(a) and 14(b) are explanatory views of spots produced by the diffracting action of patterns in the reflection film.
Figure 14B:
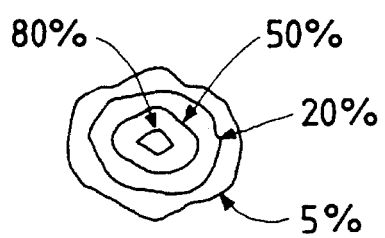

That is, when the patterns of the opening portions are formed periodically, the diffracting action operates so that the spot of transmission signal light in the light transmission path is divided into a large number of points. For example, in the case of patterns of 20 μm-wide stripes provided at intervals of a pitch of 40 μm, the spot in the light transmission path is divided into three spots arranged at intervals of 39 μm as shown in FIG. 14(*a*). Among the three spots, only the middle spot can be coupled with the light transmission path such as fiber or the like. As a result, the efficiency of coupling to the light transmission path is reduced to 24% in the case where light incident to the lens is considered to be 100%. Although the distance between the three spots is widened to make the center spot light intensive in the case where the width of each stripe is reduced, the efficiency of coupling to the light transmission path is 30% even in this case. In FIGS. 14(*a*) and 14(*b*), 80%, 50%, . . . represent values of light intensity when the peak intensity of light is considered to be 100.

On the other hand, in the case where irregular patterns of opening portions are applied to the reflection film 47 as shown in FIG. 13, for example, the division of the spot can be prevented as shown in FIG. 14(*b*) which shows the case of 5000 patterns (0.24 mm×0.3 mm light-receiving surface) with the diameter of the opening portions of the reflection film of 3 μm. Accordingly, a single spot large in intensity can be obtained. The diameter of the opening portions may be changed to apply irregular patterns or, for example, irregular patterns can be obtained by determining the positions of the opening portions at random while keeping the diameter of the opening portions constant. The positions of the opening portions can be determined easily at random, for example, by using a computer and software for determining the positions of the opening portions in accordance with random numbers.

In the case where 100 opening portions with the diameter of 21.4 μm are provided in a 0.24 mm×0.3 mm light-receiving surface by this method, the efficiency of coupling to the light transmission path and the factor of transmission to the photodiode are 35% and 50%, respectively. In the case where 270 opening portions with the diameter of 13 μm are provided, the efficiency of coupling to the light transmission path is improved to be 40% while the factor of transmission to the photodiode is 50%. In the case where 5000 opening portions with the diameter of 3 μm are provided at random, the efficiency of coupling to the light transmission path is improved to be 50% while the factor of transmission to the photodiode is 50%. In the case where 94000 opening portions with the diameter of 0.7 μm are provided, the efficiency of coupling to the light transmission path is improved to be 52% which is near 55% as the efficiency of coupling from a perfect flat surface. The transmission factor to the photodiode is however reduced to 30%. The results are shown in FIG. 15. In FIG. 15, the dot-and-dash line represents the transmission factor to the photodiode.

That is, the coupling efficiency is improved more greatly as the diameter of the opening portions decreases and as the number of the opening portions increases. The transmission factor to the photodiode is however reduced as the diameter of the opening portions decreases to a value of not larger than the wave length of detection signal light. The fiber coupling efficiency is preferably not smaller than 45%. The pore size is preferably not larger than about 7 μm, that is, not larger than 5 times the wave length of the detection signal light. On the other hand, the transmission factor to the photodiode is preferably not smaller than 30%. The pore size is preferably not smaller than 0.75 μm, that is, not smaller than ½ of the wave length of the detection signal light. Accordingly, the diameter of the opening portions is preferably in a range of from half of the wave length of the detection signal light to 5 times the wave length. Alternatively, gap portions between circular reflection films may be used as the opening portions. The ratio of reflection to transmission is preferably set to be about 50%. Also in this case, it is preferable from the same reason as described above that the diameter of the reflection films is in a range of from half of the wave length of the detection signal light to 5 times the wave length. Results of examination of the coupling efficiency by changing the width of each stripe in the case where the opening portions are provided not as pores but as stripes, are shown by the dotted line in FIG. 15 in the same manner as described above.

Figure 16:
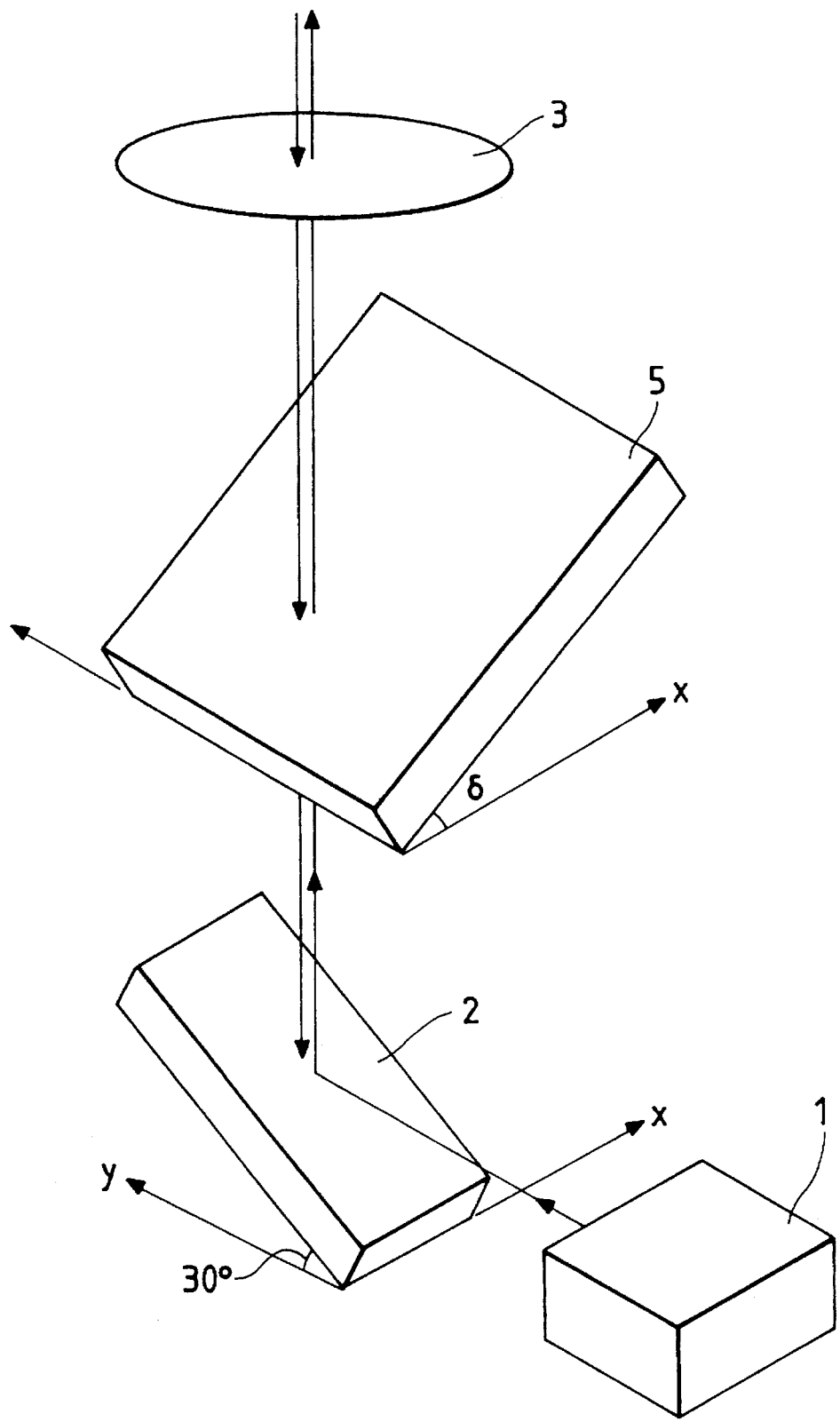
FIG. 16 is an explanatory view of a transceiver module for optical communication according to a fourth embodiment of the present invention.
Figure 19:
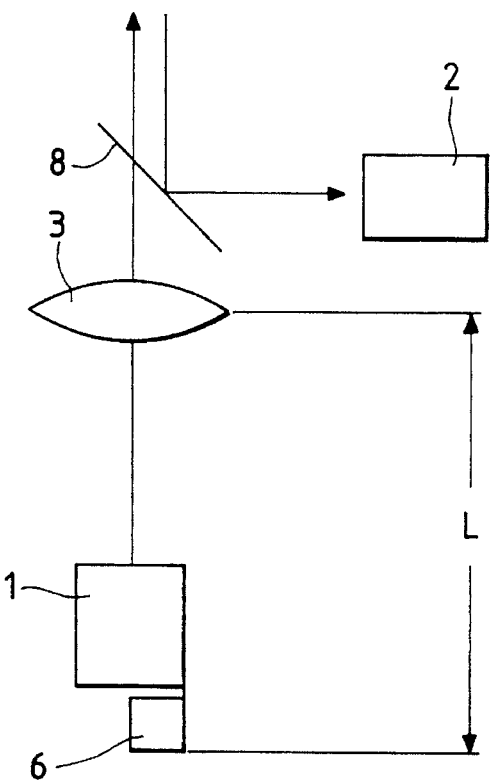
FIG. 19 is a schematic explanatory view of a conventional transceiver module for optical communication.
Figure 20:
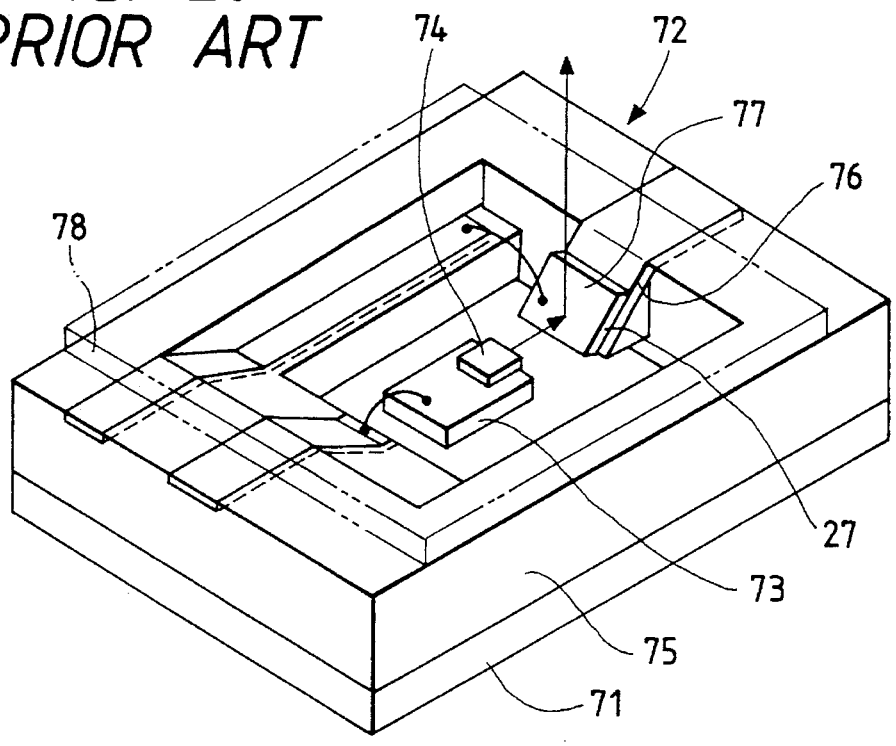
FIG. 20 is an explanatory view of an example of the light-emitting element portion in a conventional transceiver module for optical communication.

A fourth embodiment for eliminating the polarization dependence of the detection signal light will be described below. In FIG. 16, reference numeral 1 designates a light-emitting element, 2 a light-receiving element, 3 a coupling lens and 5 a cover glass arranged in the front of the light-emitting and light-receiving elements 1 and 2. In this embodiment, the cover glass 5 is arranged obliquely with respect to the detection signal light so that polarization dependence caused by oblique incidence to the light-receiving element 2 is canceled by polarization dependence caused by oblique incidence to the cover glass 5. That is, as shown in FIG. 16, in the case where the surface of the light-receiving element 2 is inclined at an angle of 30° with respect to an y-axis in an x-y plane, the polarization dependence is canceled by inclining the cover glass 5 at an angle of 30° with respect to an x-axis in the x-y plane. With respect to the direction of inclination, by inclining the cover glass 5 with respect to the x-axis as against the inclination of the light-receiving element 2 with respect to the y-axis, polarization in the x-direction is P polarization for the cover glass high in transmission factor but S polarization for the light-receiving element low in transmission factor. On the other hand, polarization in the y-direction is S polarization for the cover glass low in transmission factor but P polarization for the light-receiving element high in transmission factor. For the aforementioned reason, polarization dependence is canceled.

Further, astigmatism caused by astigmatic difference which is apt to occur in the case where a semiconductor laser is used as the light-emitting element 1, can be corrected by inclining the cover glass 5. Because the beam emitted from the semiconductor laser is only linear polarization light as described above, the reflection factor is constant even in the case where the beam is obliquely incident to the surface of the light-receiving element 2. If an astigmatic difference has occurred in the semiconductor laser, the beam advances so that astigmatism occurs in the condensed spot. The transmission signal light enters into the cover glass 5 obliquely.

For example, by inclining the cover glass 5 with a direction perpendicular to the direction of linear polarization of the laser light beam as an axis, the laser beam of diffusion light is refracted asymmetrically both in the x-direction and in the y-direction when it passes through the inclined cover glass 5. As a result, the light rays in an x-axis section advance as if they were emitted in the front of the light rays in an y-axis section. The laser light beam emitted from the semiconductor laser chip in which an astigmatic difference has occurred, however, has astigmatism as if the light rays in the y-axis section were emitted in the front of the light rays in the x-axis section. As a result, astigmatism in the semiconductor laser chip is corrected by inclining the cover glass 5.

More in detail, correctable astigmatic difference $\Delta z$ is represented by the equation:

$$\Delta z = -d_2 \times [(n_2^2-1) \sin^2\delta] \div (n_2^2 - \sin^2\delta)^{3/2} \quad (1)$$

in which $n_2$ represents the refracting index of the cover glass, $d_2$ represents the thickness of the cover glass, and $\delta$ represents the inclination of the cover glass. When, for example, the refracting index $n_2=1.5$ of the cover glass, the thickness $d_2=0.2$ mm of the cover glass and the inclination $\delta=30°$ of the cover glass are substituted into the equation (1), the correctable $\Delta z$ is represented by $\Delta z=22$ μm.

Accordingly, the astigmatic difference of the semiconductor laser diode can be corrected by changing the refracting index $n_2$ of the cover glass, the thickness $d_2$ of the cover glass and the inclination $\delta$ of the cover glass in accordance with the astigmatic difference thereof. In order to heighten the refracting index of the surface of the cover glass and heighten polarization dependence, adjustment can be made by coating one surface of the cover glass 5 with a material of high refracting index as described above. Examples of the high refracting index material used include $TiO_2$, $Ta_2O_5$, $ZrO_2$ (n=1.9 to 2.2) and so on. In this case, it is preferable that the opposite surface of the cover glass is coated with an antireflection film to prevent multiple reflection.

The astigmatic difference of the semiconductor laser is corrected if the cover glass is inclined with the direction perpendicular to the direction of linear polarization of the laser light beam as an axis as described above. That is, the cover glass can be inclined so that not only this condition is satisfied but the polarization dependence of the detection signal light is corrected. For example, by inclining the light-receiving element 2 at an angle of 30° with respect to the y-axis in the x-y plane and inclining the cover glass 5 at an angle of 30° with respect to the x-axis in the x-y plane as shown in FIG. 16, the astigmatism of the transmission signal light can be eliminated and, at the same time, the polarization dependence of the detection signal light can be prevented.

According to the present invention, a light-receiving element for receiving detection signal light is provided in a light path of a light beam emitted from a light-emitting element so that the light beam is reflected. Accordingly, it is unnecessary to provide spectroscopic devices such as a half mirror and so on. Accordingly, the number of parts is reduced, so that a low-cost transceiver module is produced. Furthermore, because reflection is made in the surface side of the light-receiving element, the distance between the light-emitting element portion and the coupling lens can be shortened, so that a small-sized transceiver module is produced.

Further, the light-receiving element can serve as a light-receiving portion for receiving detection signal light and also as a monitor light-receiving portion for monitoring the emission light output, so that simplification of the element is attained. In this case, the detection light-receiving portion and the monitor light-receiving portion are formed separately on the same and one substrate to thereby make it possible to adjust power through amplifiers or the like even in the case where there is considerable difference between the power of the transmission signal light and the power of the detection signal light.

Further, the angle of the reflection surface of the light-receiving element is adjusted to shift the center axis of the reflected emission beam from the optical axis of the coupling lens by a value not smaller than $\sin^{-1}NA$ to thereby make it possible to prevent the detection signal light from returning to the light transmission path again by reflection.

Further, by providing an antireflection film on the surface of the light-receiving element and then providing a reflection film having reticulated opening portions on the antireflection film, or by setting the angle of inclination of the cover glass suitably, not only polarization dependence is avoided even in the case where the detection signal light is obliquely incident to the light-receiving element but also the variation noise of the detection signal light can be prevented by the rotation of the angle of polarization even in the case where the light-receiving element is disposed obliquely with respect to the detection signal light. Accordingly, accurate detection can be performed.

What is claimed is:

1. A transceiver module for optical communication, comprising:

a light-emitting element;

a light-receiving element;

a rod lens, light from said light-emitting element being condensed at a top end of said rod lens, a ferrule of an optical fiber being brought into physical contact with a top end surface of said rod lens so as to couple said light-emitting element and said light-receiving element with said optical fiber, and an outer diameter of said rod lens being formed to be substantially equal to an outer diameter of said ferrule;

a housing having an opening portion;

a support supported by a spring member to said housing through a cover electrode, said rod lens being held by said support; and a sleeve, an outer circumference of said rod lens being slidably fitted into one end side of said sleeve, and a top end of said ferrule of said optical fiber being slidably fitted into the other end side of said sleeve.

2. A transceiver module according to claim 1, wherein said light-emitting element and said light-receiving element are held by said support so that the relationship among said light-emitting element, said light-receiving element and said rod lens is always kept fixed.

3. A transceiver module according to claim 1 or 2, wherein a part of a surface of said light-receiving element is made to be a reflecting surface, so that a light beam emitted from said light-emitting element is reflected thereon so as to be condensed on the top end surface of said rod lens, and at the same time, detection light from said optical fiber is received by the other portion of the surface of said light-receiving element.

4. A transceiver module according to claim 1, wherein said rod lens is formed from glass material with a refraction factor of not larger than 1.49.

5. A transceiver module according to claim 1, wherein said sleeve is a spring sleeve made of phosphor bronze.

6. A transceiver module according to claim 1, wherein electrode terminals of said light-emitting element and said light-receiving element are led out to said housing side through said cover electrode.

7. A transceiver module according to claim 1, further comprising a package mounted with said light-emitting element and said light-receiving element, said package and said support being welded air-tightly, and said rod lens and said support being sealed air-tightly.

8. A transceiver module for optical communication, comprising:

a light-emitting element for emitting transmission signal light;

a coupling lens for connecting the transmission signal light emitted from said light-emitting element to a light transmission path; and a light-receiving element for receiving detection signal light from said light transmission path, wherein the transmission signal light emitted from said light-emitting element is reflected on a surface of said light-receiving element and connected to the light transmission path through said coupling lens, and the detection signal light from the light transmission path is received by said light-receiving element.

9. A transceiver module for optical communication according to claim 8, wherein said light-receiving element serves also as a monitor light-receiving element for monitoring a quantity of light emission from said light-emitting element.

10. A transceiver module for optical communication according to claim 8 or 9, wherein said light-receiving element includes a monitor light-receiving portion, and a light-receiving portion for receiving the detection signal light from the light transmission path, the two light-receiving portions being provided on one and the same substrate separately from but adjacently to each other.

11. A transceiver module for optical communication according to claim 8, wherein a surface of said light-receiving element is inclined so that a center axis of a beam after the beam emitted by said light-emitting element is reflected by said light-receiving element is shifted from an optical axis of said coupling lens by a value which is not smaller than $\sin^{-1}NA$ where NA represents a numerical aperture of said coupling lens.

12. A transceiver module for optical communication according to claim 8, wherein a reflection film having reticulated pores or a plurality of point-like reflection films are provided at least on a surface of a detection signal light receiving portion of said light-receiving element.

13. A transceiver module for optical communication according to claims 8 or 12, wherein an antireflection film is provided at least on a surface of a detection signal light receiving portion of said light-receiving element, and a reflection film having reticulated pores or a plurality of point-like reflection films are provided on said antireflection film.

14. A transceiver module for optical communication according to claim 12, wherein each of said reticulated pores has a pore size in a range of from half of a wave length of the detection signal light to five times the wave length.

15. A transceiver module for optical communication according to claim 12, wherein each of said point-like reflection films has a diameter in a range of from half of a wave length of the detection signal light to five times the wave length.

16. A transceiver module for optical communication according to claim 12, wherein the pores of said reflection film having the reticulated pores or said plurality of point-like reflection films are provided irregularly.

17. A transceiver for optical communication according to claim 13, wherein said antireflection film is formed so as to be thicker than $\lambda/4$ by a factor of from 5% to 10% when $\lambda$ represents a wave length of the transmission/detection light.

18. A transceiver for optical communication according to claim 8, wherein a cover glass is provided between a surface of said light-receiving element and the light transmission path and inclined so that the polarization dependence of the detection signal light upon transmission through said cover glass and the polarization dependence of the detection signal light upon reflection at the surface of said light-receiving element cancel each other.

19. A transceiver module for optical communication according to claim 8, wherein a cover glass is provided between said light-emitting element and said light transmission path so as to be inclined to cancel an astigmatic difference of said light-emitting element.

20. A transceiver module for optical communication according to claim 8, wherein a cover glass is provided between a surface of said light-receiving element and the light transmission path so as to be inclined so that not only a polarization dependence of the detection signal light upon transmission through said cover glass and a polarization dependence of the detection signal light upon reflection at the surface of said light-receiving element cancel each other but also an astigmatic difference of said light-emitting element and a polarization of the detection signal light due to refraction at said cover glass cancel each other.

21. A transceiver module for optical communication according to claim 18, 19 or 20, wherein said cover glass has one surface coated with a material of high refracting index for a wave length $\lambda$ of the transmission/detection light (refracting index n at the wave length $\lambda$ of the transmission/detection light) by a thickness of $\lambda/(4n)$ and the other surface coated with an antireflection film.

* * * * *